US011895716B2

(12) United States Patent
Aravind et al.

(10) Patent No.: US 11,895,716 B2
(45) Date of Patent: Feb. 6, 2024

(54) METHODS, SYSTEMS, AND COMPUTER READABLE MEDIA FOR PROVIDING A UNIFIED INTERFACE CONFIGURED TO SUPPORT INFREQUENT DATA COMMUNICATIONS VIA A NETWORK EXPOSURE FUNCTION

(71) Applicant: Oracle International Corporation, Redwood Shores, CA (US)

(72) Inventors: Srividya Aravind, Bangalore (IN); Shashikiran Bhalachandra Mahalank, Bangalore (IN); Jay Rajput, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 184 days.

(21) Appl. No.: 17/110,255

(22) Filed: Dec. 2, 2020

(65) Prior Publication Data
US 2022/0174757 A1   Jun. 2, 2022

(51) Int. Cl.
*H04W 76/12* (2018.01)
*H04L 67/14* (2022.01)
(Continued)

(52) U.S. Cl.
CPC ............. *H04W 76/12* (2018.02); *H04L 67/12* (2013.01); *H04L 67/141* (2013.01); *H04W 68/00* (2013.01)

(58) Field of Classification Search
CPC ..... H04W 76/12; H04W 48/17; H04W 76/10; H04W 76/11; H04W 76/16; H04W 88/14;
(Continued)

(56) References Cited

U.S. PATENT DOCUMENTS 9,948,646 B1    4/2018  Lai et al.
10,582,349 B1   3/2020  Huang et al.
(Continued)

FOREIGN PATENT DOCUMENTS

WO    WO 2020/164763 A1    8/2020

OTHER PUBLICATIONS

Li et al "Capability Exposure Vitalizes 5G Network" IEEE 2021 (Year: 2021).*

(Continued)

*Primary Examiner* — Omer S Mian
(74) *Attorney, Agent, or Firm* — Jenkins, Taylor & Hunt, P.A.

(57) ABSTRACT

Methods, systems, and computer readable media for providing a unified interface that is configured to support communication between a user equipment (UE) and application function (AF) via a network exposure function (NEF) are disclosed. One method includes receiving, by a NEF from a session management function (SMF), a protocol data unit (PDU) session event change notification message associated with a UE, establishing, by the NEF, a data delivery path between the UE and an application function (AF) via one of a plurality of data delivery planes that traverse the NEF in response to the PDU session event change notification message and processing, by the NEF, messages communicated between the UE and the AF over any of the plurality of data delivery planes using a single unified interface supported by the NEF.

12 Claims, 8 Drawing Sheets

(51) Int. Cl.
   *H04L 67/141* (2022.01)
   *H04W 68/00* (2009.01)
   *H04L 67/12* (2022.01)
(58) Field of Classification Search
   CPC ....... H04W 92/24; H04W 68/00; H04W 4/70;
      H04L 67/141; H04L 67/12; H04L 67/147;
      H04L 67/535; H04L 67/56; H04L 69/08;
      H04L 69/18
   See application file for complete search history.

(56) References Cited

U.S. PATENT DOCUMENTS

| | | | |
|---|---|---|---|
| 10,805,178 B2* | 10/2020 | Livanos | H04L 41/5012 |
| 11,140,523 B2 | 10/2021 | Mahalank et al. | |
| 11,190,591 B2 | 11/2021 | Shivarajapura et al. | |
| 2014/0221027 A1 | 8/2014 | Laumen et al. | |
| 2016/0007170 A1 | 1/2016 | Vaidya et al. | |
| 2017/0251342 A1 | 8/2017 | Bhalla | |
| 2017/0339534 A1 | 11/2017 | Bhalla | |
| 2018/0054799 A1 | 2/2018 | Starsinic et al. | |
| 2018/0077714 A1 | 3/2018 | Kodaypak et al. | |
| 2018/0092133 A1 | 3/2018 | Starsinic et al. | |
| 2018/0160288 A1 | 6/2018 | Chastain et al. | |
| 2018/0160292 A1 | 6/2018 | Chastain et al. | |
| 2018/0192234 A1 | 7/2018 | Mohamed et al. | |
| 2018/0220256 A1 | 8/2018 | Kotecha et al. | |
| 2018/0310141 A1 | 10/2018 | Yin et al. | |
| 2018/0324671 A1 | 11/2018 | Palnati et al. | |
| 2019/0075552 A1 | 3/2019 | Yu et al. | |
| 2019/0090122 A1 | 3/2019 | Palnati et al. | |
| 2019/0090298 A1* | 3/2019 | Abraham | H04W 76/27 |
| 2019/0261453 A1* | 8/2019 | Jain | H04W 8/08 |
| 2019/0306251 A1* | 10/2019 | Talebi Fard | H04W 76/10 |
| 2019/0313468 A1* | 10/2019 | Talebi Fard | H04W 76/12 |
| 2020/0067831 A1* | 2/2020 | Spraggins | H04L 45/306 |
| 2020/0068047 A1* | 2/2020 | Huang | H04L 67/141 |
| 2020/0100319 A1* | 3/2020 | Talebi Fard | H04W 4/02 |
| 2020/0112884 A1 | 4/2020 | Kweon et al. | |
| 2020/0120475 A1* | 4/2020 | Gupta | H04W 4/70 |
| 2020/0146077 A1 | 5/2020 | Li et al. | |
| 2020/0221286 A1* | 7/2020 | Gan | H04W 48/18 |
| 2020/0267008 A1 | 8/2020 | Chen et al. | |
| 2020/0267513 A1* | 8/2020 | Zhu | H04L 65/1033 |
| 2020/0296665 A1 | 9/2020 | Huang et al. | |
| 2020/0322881 A1* | 10/2020 | Lee | H04W 4/70 |
| 2020/0344576 A1 | 10/2020 | Li et al. | |
| 2020/0404482 A1 | 12/2020 | Xu | |
| 2021/0021672 A1 | 1/2021 | Shivarajapura et al. | |
| 2021/0029517 A1 | 1/2021 | Zhu | |
| 2021/0058766 A1 | 2/2021 | Aravamudhan et al. | |
| 2021/0068005 A1* | 3/2021 | Huang | H04W 72/1252 |
| 2021/0120377 A1 | 4/2021 | Mahalank et al. | |
| 2021/0120389 A1 | 4/2021 | Baek et al. | |
| 2021/0274575 A1* | 9/2021 | Talebi Fard | H04W 76/12 |
| 2022/0038540 A1* | 2/2022 | Tao | H04W 76/10 |
| 2022/0131941 A1* | 4/2022 | Rönneke | H04W 76/10 |

OTHER PUBLICATIONS

Notice of Allowance and Fee(s) Due and Examiner-Initiated Interview Summary for U.S. Appl. No. 16/516,238 (dated Aug. 3, 2021).
Final Office Action for U.S. Appl. No. 16/546,227 (dated Oct. 1, 2021).
Non-Final Office Action for U.S. Appl. No. 16/546,227 (dated Feb. 8, 2021).
Commonly-Assigned, co-pending U.S. Appl. No. 16/656,535 for "Methods, Systems, and Computer Readable Media for Non-Internet Protocol (Non-IP) Data Delivery Between User Equipment (UEs) and Multiple Application Servers (ASs)," (Unpublished, filed Oct. 17, 2019).
"3rd Generation Partnership Project; Technical Specification Group Core Network and Terminals; T8 reference point for Northbound APIs (Release 16)," 3GPP TS 29.122 V16.3.0, pp. 1-322 (Sep. 2019).
"3rd Generation Partnership Project; Technical Specification Group Services and System Aspects; Architecture enhancements to facilitate communications with packet data networks and applications (Release 16)," 3GPP TS 23.682 V16.4.0, pp. 1-133 (Sep. 2019).
"3rd Generation Partnership Project; Technical Specification Group Core Network and Terminals; Home Subscriber Server (HSS) diameter interfaces for interworking with packet data networks and applications (Release 15)," 3GPP TS 29.336 V15.7.0. pp. 1-75 (Sep. 2019).
"3rd Generation Partnership Project; Technical Specification Group Core Network and Terminals; Mobility Management Entity (MME) and Serving GPRS Support Node (SGSN) interfaces for interworking with packet data networks and applications (Release 16)," 3GPP TS 29.128 V16.0.0. pp. 1-51 (Sep. 2019).
"3rd Generation Partnership Project; Technical Specification Group Services and System Aspects; General Packet Radio Service (GPRS) enhancements for Evolved Universal Terrestrial Radio Access Network (E-UTRAN) access (Release 16)," 3GPP TS 23.401 V16.4.0, pp. 1-424 (Sep. 2019).
Commonly-Assigned, co-pending U.S. Appl. No. 16/546,227 for "Methods, Systems, and Computer Readable Media for Group Device Triggering for Internet of Things (IoT) Devices," (Unpublished, filed Aug. 20, 2019).
Commonly-Assigned, co-pending U.S. Appl. No. 16/516,238 for "Methods, Systems, and Computer Readable Media for Resource Optimization in Group Message Delivery for Narrowband Internet of Things (NB-IoT) Devices. " (Unpublished, filed Jul. 18, 2019).
"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413, V15.6.0, pp. 1-388 (Jul. 2019).
"3rd Generation Partnership Project; Technical Specification Group Core Network and Terminals; T8 reference point for Northbound APIs (Release 16)," 3GPP TS 29.122 V16.2.0, pp. 1-309 (Jun. 2019).
"3rd Generation Partnership Project; Technical Specification Group Core Network and Terminals; Mobile Application Part (MAP) specification (Release 15)," 3GPP TS 29.002 V15.5.0, pp. 1-1024 (Jun. 2019).
"3rd Generation Partnership Project; Technical Specification Group Services and System Aspects Architecture enhancements to facilitate communications with packet data networks and applications (Release 16)," 3GPP TS 23.682 V16.3.0, pp. 1-132 (Jun. 2019).
"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.6.0, pp. 1-960 (Jun. 2019).
"3rd Generation Partnership Project; Technical Specification Group Core Network and Terminals; Home Subscriber Server (HSS) diameter interfaces for interworking with packet data networks and applications (Release 15) " 3GPP TS 29.336 V15.6.0 pp. 1-75 (Mar. 2019).
"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128 V15.5.0, pp. 1-52 (Mar. 2019).
"3rd Generation Partnership Project; Technical Specification Group Core Network and Terminals; Tsp interface protocol between the MTC Interworking Function (MTC-IWF) and Service Capability Server (SCS) (Release 15)," 3GPP TS 29.368 V15.0.0, pp. 1-33 (Jun. 2018).
"3rd Generation Partnership Project; Technical Specification Group Core Network and Terminals; Diameter-based T4 interface for communications with packet data networks and applications (Release 15)," 3GPP TS 29.337 V15.0.0. pp. 1-24 (Jun. 2018).
Non-Final Office Action for U.S. Appl. No. 16/546,227 (dated Jun. 14, 2021).
Notice of Allowance and Fee(s) Due for U.S. Appl. No. 16/656,535 (dated May 19, 2021).

(56) References Cited

OTHER PUBLICATIONS

Non-Final Office Action for U.S. Appl. No. 16/516,238 (dated Mar. 24, 2021).
Notice of Allowance and Fee(s) Due for U.S. Appl. No. 16/516,238 (dated Aug. 3, 2021).
Final Office Action for U.S. Appl. No. 16/546,227 (dated Jun. 24, 2022).
Notification of Transmittal of the International Search Report and the Written Opinion of the International Searching Authority, or the Declaration for International Application No. PCT/US2021/059683 (dated Feb. 28, 2022).
Non-Final Office Action for U.S. Appl. No. 16/546,227 (dated Mar. 9, 2022).
Advisory Action for U.S. Appl. No. 16/546,227 (dated Jan. 24, 2022).
"3rd Generation Partnership Project; Technical Specification Group Core Network and Terminals; 5G System; Network Exposure Function Northbound APIs; Stage 3 (Release 16)," 3GPP TS 29.522, V16.5.0, pp. 1-161 (Sep. 2020).
"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).
"3rd Generation Partnership Project; Technical Specification Group Services and System Aspects; Procedures for the 5G System (5GS); Stage 2 (Release 16)," 3GPP TS 23.502, V16.6.0, pp. 1-597 (Sep. 2020).
"3rd Generation Partnership Project; Technical Specification Group Core Network and Terminals; T8 reference point for Northbound APIs; (Release 16)," 3GPP TS 29.122, V16.7.0, pp. 1-361 (Sep. 2020).
"3rd Generation Partnership Project; Technical Specification Group Services and System Aspects; Architecture enhancements to facilitate communications with packet data networks and applications (Release 16)," 3GPP TS 23.682, V16.8.0, pp. 1-135 (Sep. 2020).
Advisory Action for U.S. Appl. No. 16/546,227 (dated Oct. 6, 2022).

* cited by examiner

METHODS, SYSTEMS, AND COMPUTER READABLE MEDIA FOR PROVIDING A UNIFIED INTERFACE CONFIGURED TO SUPPORT INFREQUENT DATA COMMUNICATIONS VIA A NETWORK EXPOSURE FUNCTION

TECHNICAL FIELD

The subject matter described herein relates to improving data communications conducted in fifth generation (5G) telecommunication networks. More particularly, the subject matter described herein relates to methods, systems, and computer readable media for providing a unified interface that is configured to support small and infrequent data communication between a user equipment and application function via a network exposure function.

BACKGROUND

Presently, 5G telecommunications networks often need to conduct infrequent communication of small data between low powered user equipment (UE) and application functions (AFs). In particular, these small and infrequent communications are used for cellular based communication between Internet of things (IoT) devices and AFs. This manner of communication enables low powered wide area (LWPA)-based IoT use cases where power constrained UE devices may utilize both the 5G control plane and the 5G data plane for data transmission. In general, 3GPP provides different methods and/or interfaces that facilitate infrequent communications of small data such as using Internet protocol (IP) data delivery using an N6 interface over the user plane or using non-IP data delivery (NIDD) over a control plane. Although there are several different paths that can be used to communicate small and infrequent data in 5G communication networks, several technical difficulties can arise when an AF is required to support different methods of AF communication. For example, problems may arise when a roaming network is configured to only support Internet protocol (IP) data delivery and is not able to support non-Internet protocol data delivery (NIDD). Difficulties can also arise in local breakout roaming scenarios where a visited network supports NIDD via a user plane function (UPF) whereas the UE's home network supports NIDD via a network exposure function (NEF). Further, problems for an AF can also appear when a UE is used across multiple network slices and each slice may support a different deployment model (e.g., a slice provisioned with a NEF, a slice provisioned without a NEF, or a slice that only supports IP data delivery via a UPF without a NEF).

As such, there exists a need for improved methods and systems for providing a unified interface configured to support infrequent communications via a network exposure function or service.

SUMMARY

Methods, systems, and computer readable media for providing a unified interface that is configured to support communication between a user equipment (UE) and application function (AF) via a network exposure function (NEF) are disclosed. One method includes receiving, by a NEF from a session management function (SMF), a protocol data unit (PDU) session event change notification message associated with a UE, establishing, by the NEF, a data delivery path between the UE and an application function (AF) via one of a plurality of data delivery planes that traverse the NEF in response to the PDU session event change notification message and processing, by the NEF, messages communicated between the UE and the AF over any of the plurality of data delivery planes using a single unified interface supported by the NEF.

According to an aspect of the subject matter described herein, a method wherein the plurality of data delivery planes includes a non-IP data delivery (NIDD) based data communication path established in a control plane between the UE and the AF via the NEF, a NIDD based data communication path established between the UE and the AF via the NEF and a UPF that are communicatively connected using a N6 point to point tunnel, and an Internet protocol (IP) data delivery based data communication path between the UE and AF that are communicatively connected via the NEF and the UPF using a N6 interface.

According to an aspect of the subject matter described herein, a method wherein the UE includes a low-powered Internet of things (IoT) device.

According to an aspect of the subject matter described herein, a method wherein the single unified interface includes a T8 and/or N33 interface.

According to an aspect of the subject matter described herein, a method wherein the NEF is configured to switch between the plurality of data delivery planes while maintaining the attachment of the UE.

According to an aspect of the subject matter described herein, a method wherein the NEF is configured to establish listening servers to monitor for packet traffic from a UPF in response to receiving the PDU session event change notification message.

According to an aspect of the subject matter described herein, a method wherein the NEF functions as a PDU session anchor during the use of each of the plurality of data delivery planes. One example system for providing a unified interface that is configured to support communication between a user equipment (UE) and application function (AF) via a network exposure function (NEF) includes a network node comprising at least one processor and memory, wherein the memory and the at least one processor belong to unified interface device configured to host a NEF. The network node further includes a unified interface manager that is stored in the memory of the NEF and when executed by the at least one processor is configured for receiving from a session management function (SMF) a protocol data unit (PDU) session event change notification message associated with a UE, establishing a data delivery path between the UE and an application function (AF) via one of a plurality of data delivery planes that traverse the NEF in response to the PDU session event change notification message, and processing messages communicated between the UE and the AF over any of the plurality of data delivery planes using a single unified interface supported by the NEF.

According to an aspect of the subject matter described herein, a system wherein the plurality of data delivery planes includes a non-IP data delivery (NIDD) based data communication path established in a control plane between the UE and the AF via the NEF, a NIDD based data communication path established between the UE and the AF via the NEF and a UPF that are communicatively connected using a N6 point to point tunnel, and an Internet protocol (IP) data delivery based data communication path between the UE and AF that are communicatively connected via the NEF and the UPF using a N6 interface.

According to an aspect of the subject matter described herein, a system wherein the UE includes a low-powered Internet of things (IoT) device.

According to an aspect of the subject matter described herein, a system wherein the single unified interface includes a T8 and/or N33 interface.

According to an aspect of the subject matter described herein, a system wherein the NEF is configured to switch between the plurality of data delivery planes while maintaining the attachment of the UE.

According to an aspect of the subject matter described herein, a system wherein the NEF is configured to establish listening servers to monitor for packet traffic from a UPF in response to receiving the PDU session event change notification message.

According to an aspect of the subject matter described herein, a system wherein the NEF functions as a PDU session anchor during the use of each of the plurality of data delivery planes.

One example non-transitory computer readable medium comprising computer executable instructions embodied in the non-transitory computer readable medium that when executed by at least one processor of at least one computer cause the at least one computer to perform steps comprising: receiving, by a NEF from a session management function (SMF), a protocol data unit (PDU) session event change notification message associated with a UE, establishing, by the NEF, a data delivery path between the UE and an application function (AF) via one of a plurality of data delivery planes that traverse the NEF in response to the PDU session event change notification message and processing, by the NEF, messages communicated between the UE and the AF over any of the plurality of data delivery planes using a single unified interface supported by the NEF.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Reference will now be made in detail to various embodiments of the subject matter described herein, examples of which are illustrated in the accompanying drawings. Wherever possible, the same reference numbers will be used throughout the drawings to refer to the same or like parts.

The communication of small infrequent data between a user equipment and an application function in a 5G network is primarily used for low-powered IoT devices or other which have power constraints or restrictions. Notably, there are three modes or interfaces that can be used to facilitate the small infrequent data communication between the user equipment and the application function for low powered or power constrained IoT devices operating in the 5G network. For example, the first mode of data communication can be conducted as a non-IP data delivery (NIDD) based data transmission between the user equipment and the application function via a NEF that using an N33 interface and/or a T8 interface over the 5G system control plane. The second mode of data communication can be conducted as NIDD based data communication between the user equipment and the application function via a UPF using an N6 point to point tunnel interface over the 5G system control plane. Further, a third mode of data communication can be conducted as IP data delivery between the user equipment and the application function via the UPF using an N6 interface over a 5G system user plane. These three different data delivery options are respectively illustrated in FIGS. 1-3 and described in detail below.

Figure 1:
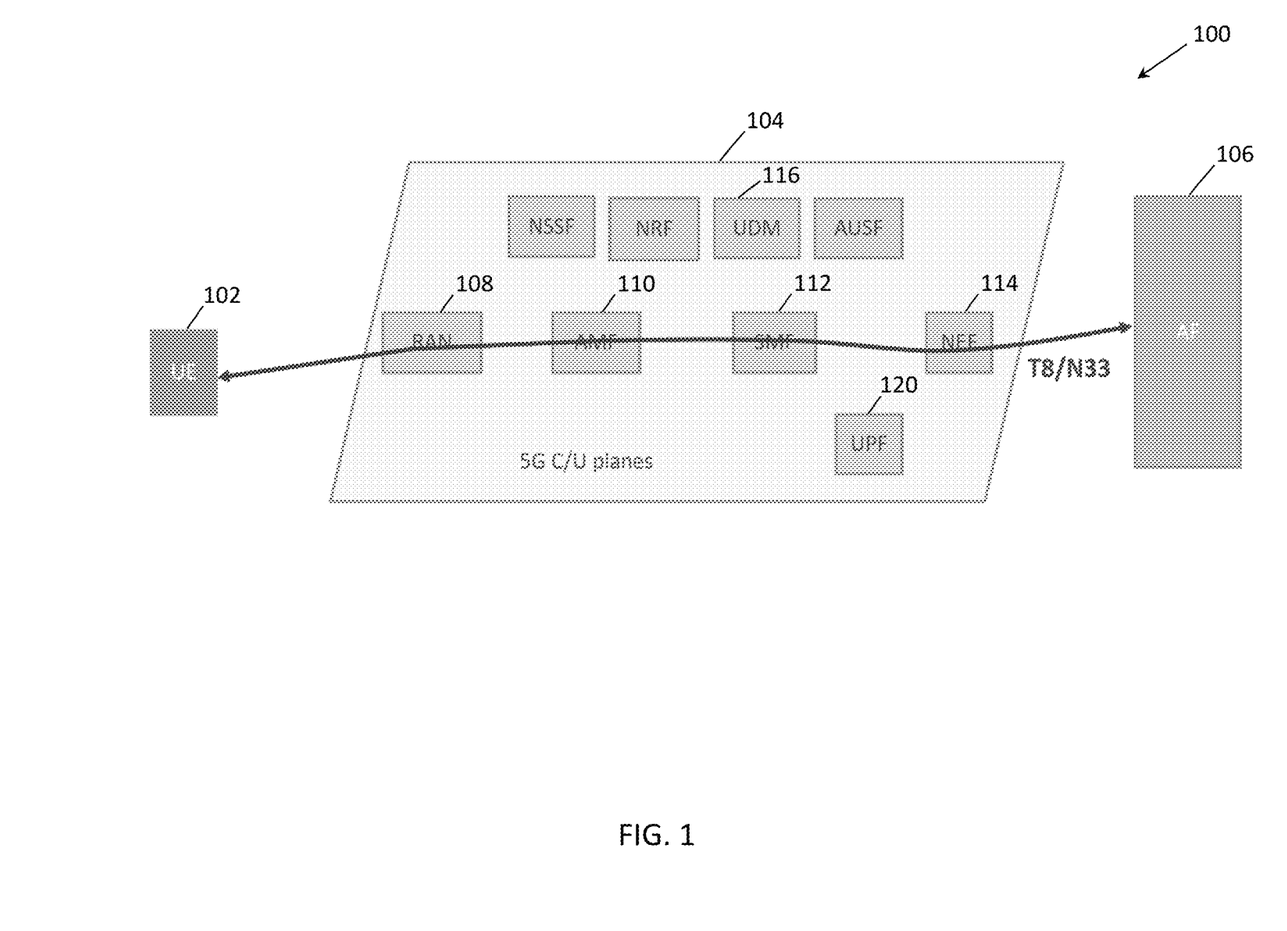
FIG. 1 is a logical block diagram of a control plane configured to provide a non-IP data delivery (NIDD) path between a user equipment (UE) and an application function via a NEF.

FIG. 1 depicts a NIDD data path that exists between a user equipment and application function over a 5G control plane via a NEF. In particular, FIG. 1 shows a 5G system 100 that includes a user equipment 102, a control plane 104, and an application function 106. Further, FIG. 1 illustrates control plane 104 as including a radio access network (RAN) 108, an access and mobility management function (AMF) 110, a session management function (SMF) 112, a network exposure function (NEF) 114, a unified data management function (UDM) 116 that are collectively responsible for establishing the data communication path between user equipment 102 and application function 106 over a control plane. Notably, a protocol data unit (PDU) session establishment procedure is conducted between user equipment 102 and SMF 112. During the session establishment procedure, a NEF identity (e.g., corresponding to NEF 114) is acquired by SMF 112 as part of the subscription data that is received from UDM 116. Once the NEF identity information is received by SMF 112, an SMF-NEF connection establishment procedure is conducted. In particular, a NIDD mobile originated (MO) message communication path between user equipment 102 and application function 106 is established. Similarly, a NIDD mobile terminated (MT) message communication path is established between application function 106 and user equipment 102. To facilitate the communication path(s), an N33/T8 interface between application function 106 and NEF 114 is established by the NEF. Once the communication path through control plane 104 is established, user equipment 102 and application function 106 can communicate small and infrequent data over 5G system 100. Specifically, NEF based NIDD data communication provides an API based interface (i.e., a T8/N33 interface) towards application function 106 for both MO and MT message communication between user equipment 102 and application function 106 over control plane 104. As such, NEF 114 serves and functions as a PDU session anchor for the data delivery path in this scenario.

Figure 2:
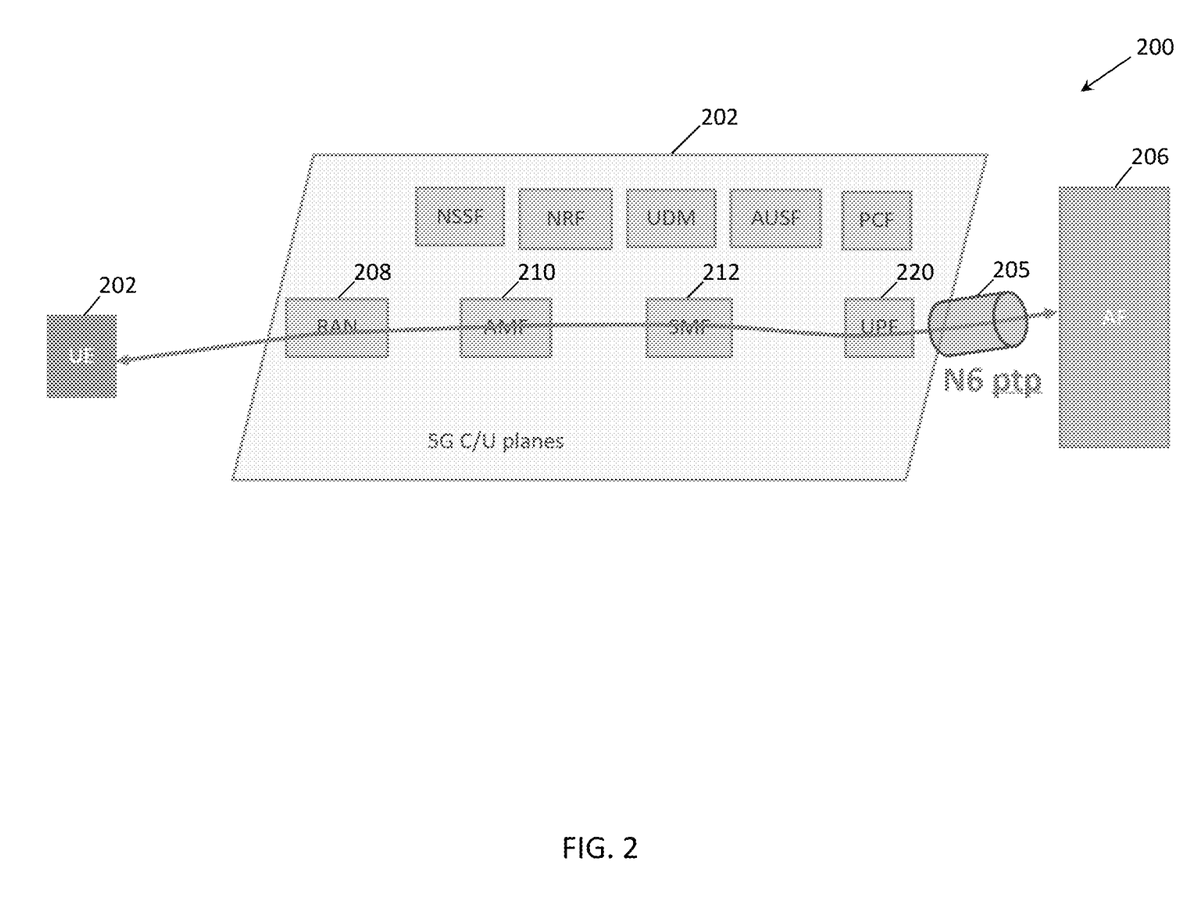
FIG. 2 is a logical block diagram of a control plane configured to provide a non-IP data delivery (NIDD) path between a UE and an application function via a user plane function (UPF) and a N6 point to point (PTP) tunnel.

FIG. 2 depicts a NIDD data path that exists between a user equipment and application function over a 5G control plane via a UPF. In particular, FIG. 2 shows a 5G system 200 that includes a user equipment 202, a control plane 204, and an application function 206. Further, FIG. 2 illustrates control plane 204 as including a RAN 208, AMF 210, SMF 212, and UPF 220 that are collectively responsible for establishing the data communication path. Notably, data communication using NIDD via UPF over control plane 204 is initiated by a PDU session event procedure (e.g., a PDU session establishment procedure) that is conducted between user equipment 202 and SMF 212. During this procedure, SMF 212 selects a UPF (e.g., UPF 220) and performs an N4 session establishment procedure (i.e., between SMF 212 and UPF 220). Afterwards, an N6 point to point tunnel 205 is established by the UPF between UPF 220 and application function 206 to support the unstructured NIDD data communication in 5G system 200. In particular, UPF based NIDD provides an N6 point to point tunnel interface (between UPF 220 and application function 206) for MO and MT message communication between user equipment 202 and application function 206 over control plane 204. As such, UPF 220 serves and functions as a PDU session anchor for the data delivery path in this scenario.

Figure 3:
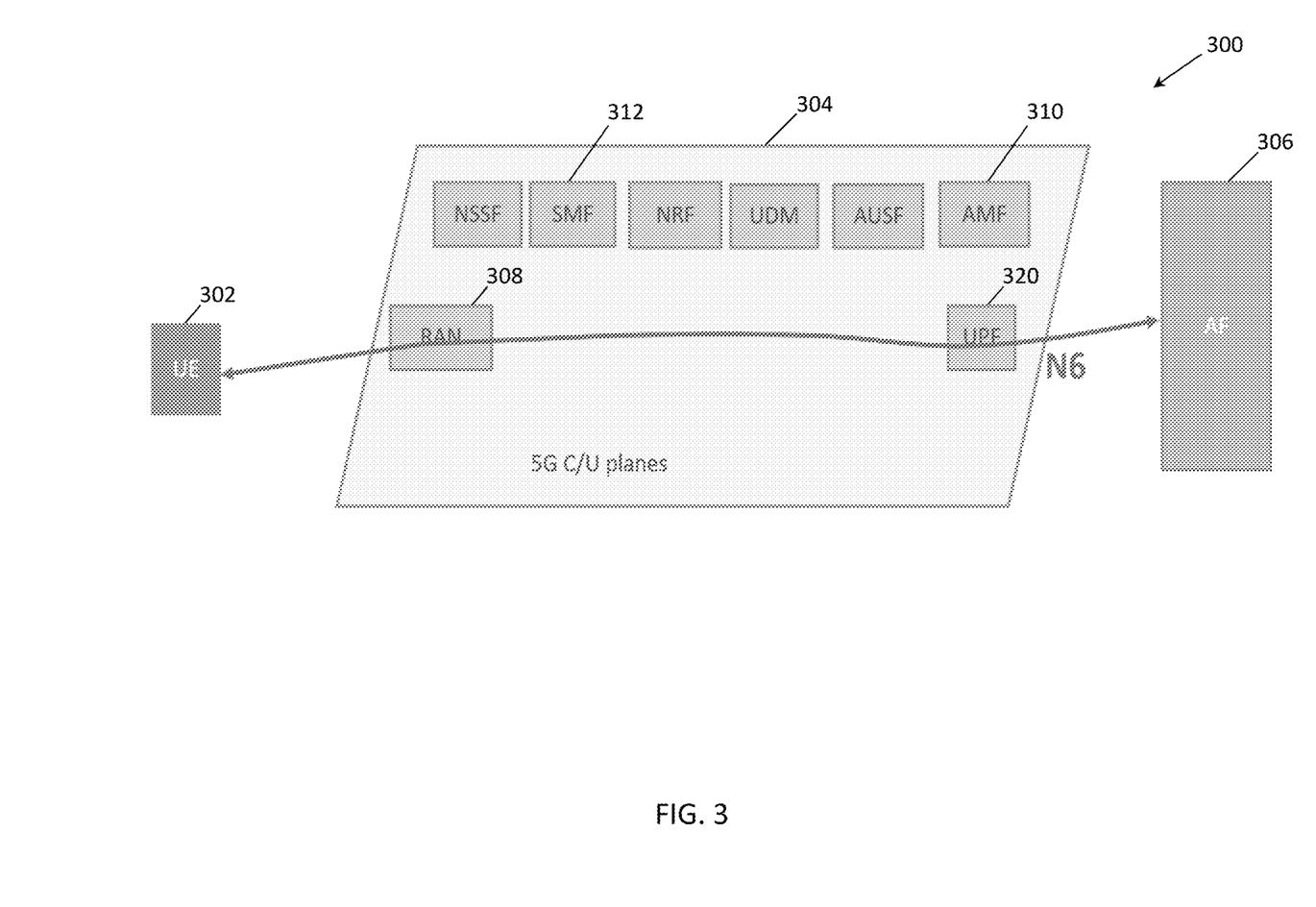
FIG. 3 is a logical block diagram of a user plane that provides an IP data delivery path between a UE and an application function via a UPF.

FIG. 3 depicts an IP data delivery path that exists between a user equipment and application function over a 5G user plane via a UPF. In particular, FIG. 3 shows a 5G system 300 that includes a user equipment 302, a user plane 304, and application function 306. Further, FIG. 3 illustrates user plane 304 as including a RAN 308, SMF 312, and UPF 320 that are collectively responsible for establishing the data communication path on the user plane. Notably, data communication using IP data delivery via UPF over user plane 304 is initiated by a PDU session event procedure (e.g., PDU session establishment procedure) that is conducted between user equipment 302 and SMF 312. During this procedure, SMF 312 selects UPF 230 and performs an N4 session establishment procedure (i.e., between SMF 312 and UPF 320). Afterwards, data communication over the user plane 304 is conducted. Notably, UPF based IP data delivery provides an N6 interface (i.e., between UPF 320 and application function 306) for MO and MT message communication between user equipment 302 and application function 306 over the 5G data plane (i.e., user plane 304). As such, UPF 320 acts as a PDU session anchor for the data delivery path in this scenario.

In general, there are several situations where the application function will be required to support all three of the aforementioned methods of application function communication. Example scenarios include a user equipment entering a roaming network that only supports conventional IP data delivery and is not configured to support NIDD data delivery or a local breakout roaming scenario where a user equipment leaves a home network that supports NIDD via NEF and enters a visited network that only supports NIDD via UPF. Another example is if the user equipment is used across multiple network slices, wherein each slice supports a different deployment model (e.g., a first slice is equipped with a NEF, an adjacent slice is equipped without a NEF or only supports IP data delivery via UPF without a NEF). Accordingly, it would be advantageous for the application function to be configured to support a plurality of interfaces for a number of different data delivery paths. As such, the disclosed subject matter pertains to a NEF element that is provisioned with a unified interface that is configured to internally support i) an N33/T8 interface (i.e., NIDD via NEF) using a control plane data transfer, ii) a N6 point to point tunnel interface (i.e., NIDD via UPF) using a control plane data transfer, and iii) a N6 interface (i.e., IP data delivery) based interface that is specific to IoT use cases utilizing a user plane data transfer.

It should be noted that an AF that is configured to only support an N6 interface (i.e., does not include NEF interface capability) is significantly limited and prevents the application function to leverage many exposure services offered by a NEF. In particular, an AF restricted in this manner would be unable to utilize valuable services provided by a NEF including, but not limited to, i) monitoring an IoT device state through MONTE service, ii) an AF traffic influencing service for edge routing use cases, iii) charging third-party service providers (i.e., sponsor data connectivity), iv) setting network parameters (e.g., sleep timers and the like), and v) setting an application function session with required quality of service (QoS) and the like.

In contrast, the disclosed subject matter is configured to utilize a single unified interface at the application function via NEF for all three of the aforementioned deployment models. In particular, the NEF is configured to track the current data delivery path (e.g., PDU session paths) utilized by the user equipment and accommodate any path switching using a single T8/N33 interface that is directed towards an application function destination in order to enable the small and infrequent data communication between the user equipment and the application function.

Figure 4:
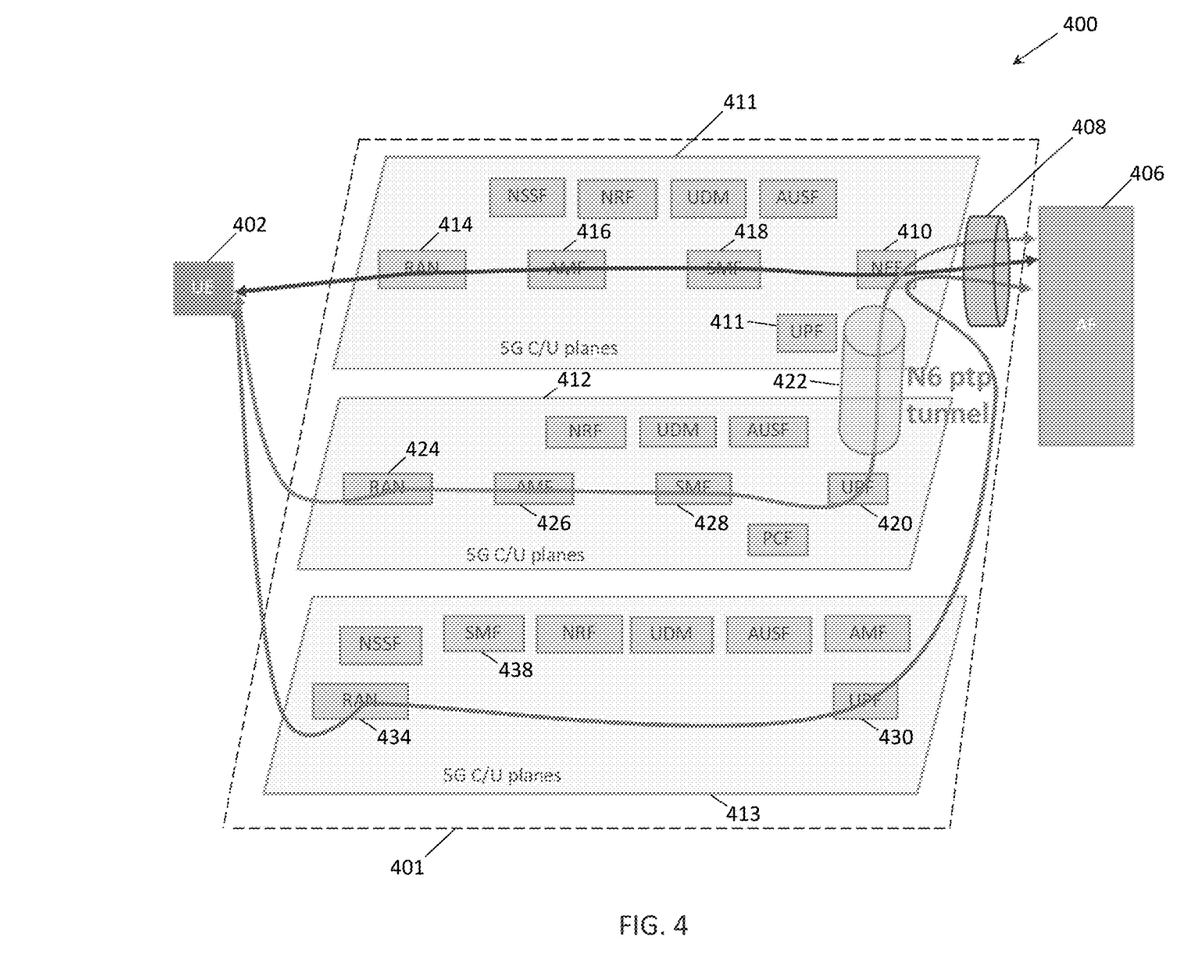
FIG. 4 is a logical block diagram depicting an aggregated data delivery system that is configured to establish a plurality of data delivery paths between a UE and an AF via a NEF and associated unified interface.

FIG. 4 depicts a logical block diagram of a 5G communication network 400. Notably, network 400 comprises an aggregated unified interface system 401 that facilitates the communication paths between a user equipment 402 and an application function 406. In particular, system 401 includes three communication planes 411-413, and a unified interface 408 that can be used to provide a small data delivery communication path between user equipment 402 (e.g., a low powered IoT device) and application function 406. Although FIG. 4 shows a number of instances of the same network element (e.g., UPFs 420 and UPF 430, RAN 414, 424, 434, etc.) existing on the different communication planes, FIG. 4 is a logical diagram and as such, these represented network elements may be embodied as a single network element that is configured to function on each of the illustrated communication planes.

In some embodiments, communication plane 411 comprises a control plane that establishes a NIDD data path between user equipment 402 and application function 406 via NEF 410 (as per 3GPP standards). Notably, NEF 410 can be used to establish a communicative connection with unified interface 408 to communicate MO and MT message data communications between user equipment 402 and application function 406.

In some embodiments, unified interface 408 can be embodied as a separate element or incorporated within NEF 410. For example, NEF 410 can be configured to operate or act as an interworking function (IWF) and can offload any multiple interface requirement (e.g., N6 point-to-point interface and N6 interface) from the AF.

In particular, NEF 410 functions as a PDU session anchor for the small data delivery path over communication plane 411, as well as communication planes 412-413 as described below.

In some embodiments, system 401 further includes a second communication plane 412 that comprises a control plane that provides a NIDD data path between user equipment 402 and application function 406. In particular, communication plane 412 provides a NIDD data path via UPF 420 (as per 3GPP standards) that includes an N6 point to point tunnel interface 422. Specifically, N6 point to point tunnel interface 422 is established between UPF 420 and the NEF 410 that is located in communication plane 411. Accordingly, the MO and MT messaging communication conducted between user equipment 402 and application function 406 traverses through communication plane 412 using point-to-point tunnel interface 422, NEF 410, and unified interface 408.

Likewise, system 401 includes a third communication plane 413 comprising a user plane (or data plane) that provides an IP data delivery path between user equipment 402 and application function 406. In particular, communication plane 413 enables a UPF based IP data path (as per 3GPP standards) over an N6 interface that terminates at the NEF 410 that is located in communication plane 411. Notably, MO and MT messaging communication between user equipment 402 and application function 406 is facilitated via NEF 410 and unified interface 408 as shown in FIG. 4.

Figure 5:
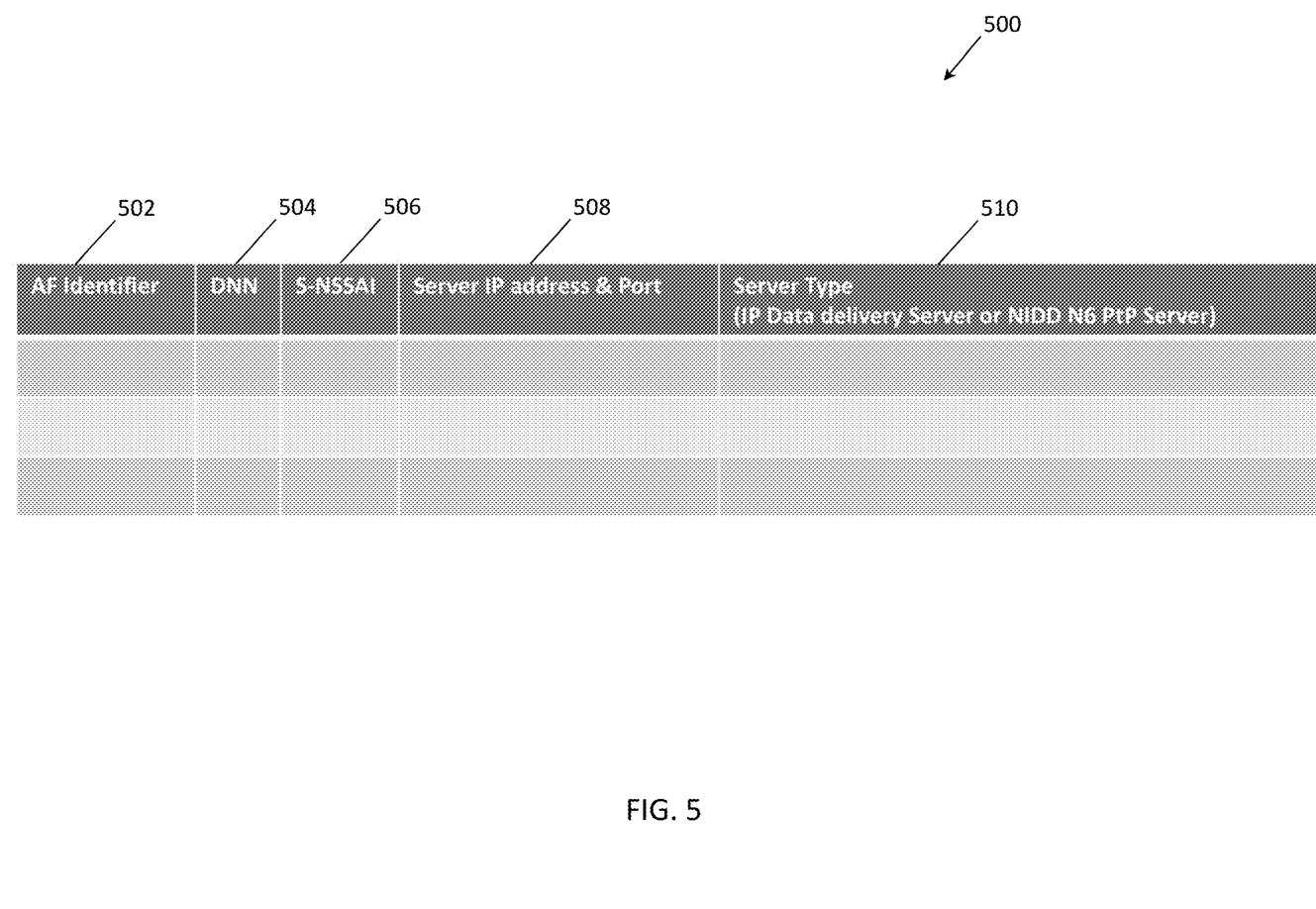
FIG. 5 is an exemplary configuration table for mapping NEF listening servers and ports to destination AFs.

As indicated above, the disclosed subject matter supports a unified interface 408 that enables communication between NEF 410 in the first communication plane 411 and application function 406. Notably, NEF 410 is provisioned with an AF configuration table 500 (as shown in FIG. 5), which maps AFs and their corresponding IP addresses, data network name (DNN) information, and/or single Network Slice Selection Assistance Information (NSSAI) identification data to the N6 listening ports of the NEF. In particular, FIG. 5 depicts configuration table 500, which includes an application function identifier column 502, a DNN column 504, a S-NSSAI column 506, a NEF listening server IP address and port column 508, and a server type column 510. The information stored in configuration table 500 can be used at NEF 410 to start listening servers that monitor for incoming packets received on an N6 interface or N6 point-to-point tunnel interface as described below. Specifically, these listening servers are configured to enable data delivery between user equipment 402 and application function 406 through a UPF 430 via an N6 interface (e.g., IP data delivery) or an N6 point-to-point tunnel interface (e.g., NIDD via UPF 420 and tunnel interface 422).

After being preconfigured, NEF 410 initiates listening servers to listen for incoming N6 (TCP/IP) from UPF 430 and N6 point-to-point tunneled (e.g., unified data protocol (UDP)/IP) data traffic from UPF 420 using configuration details (not shown) contained in table 500. NEF 410 can perform the NIDD configuration procedure for a given user equipment as per 3GPP specification(s). For example, NEF 410 can create the NIDD configuration context for a given user equipment using the application function identifier, T8 Long Term Transaction Reference Identifier (TLTRI) information (e.g., NIDD context identifier), subscription permanent identifier (SUPI), and generic public subscription identifier (GPSI). Notably, NEF 410 can be preconfigured by storing DNN and S-NSSAI information as per 3GPP specifications that map to an application function identifier and optionally, user equipment identifiers in configuration table 500.

In some embodiments, NEF 410 subscribes with SMF 418 in order to monitor for one or more of a plurality of PDU session events (e.g., as indicated in TS 29.528) for user equipment 402 sending a Nsmf_EventExposure_Subscribe service operation request to SMF 418. Notably, the request can include user equipment GPSI and/or SUPI data that was received in the NIDD configuration call flow. Examples of the aforementioned plurality of PDU session events includes, but is not limited to, i) user plane (UP) path change, ii) a PDU session release procedure, iii) a public land mobile network (PLMN) change, iv) a UE IP address change, v) a communication failure, and vi) a PDU session establishment procedure.

After NEF 410 subscribes with the SMF, user equipment 402 establishes the PDU session with NEF 410, UPF 420 (or UPF 430) using any one of the three modes. If the user equipment attempts to establish a session over NIDD via NEF 410 through a control plane, then communication plane 411 is utilized. In embodiments where the session is established over NIDD via a NEF, NEF 410 is notified during the PDU session establishment procedure through a Nnef_SMContext_Create Request message from the SMF (e.g., SMF 418 or 428). Alternatively, in embodiments where the session is established via a UPF (e.g., NIDD via UPF or IP data delivery via UPF), the NEF subscribes to the SMF to be notified about PDU session events.

Figure 6:
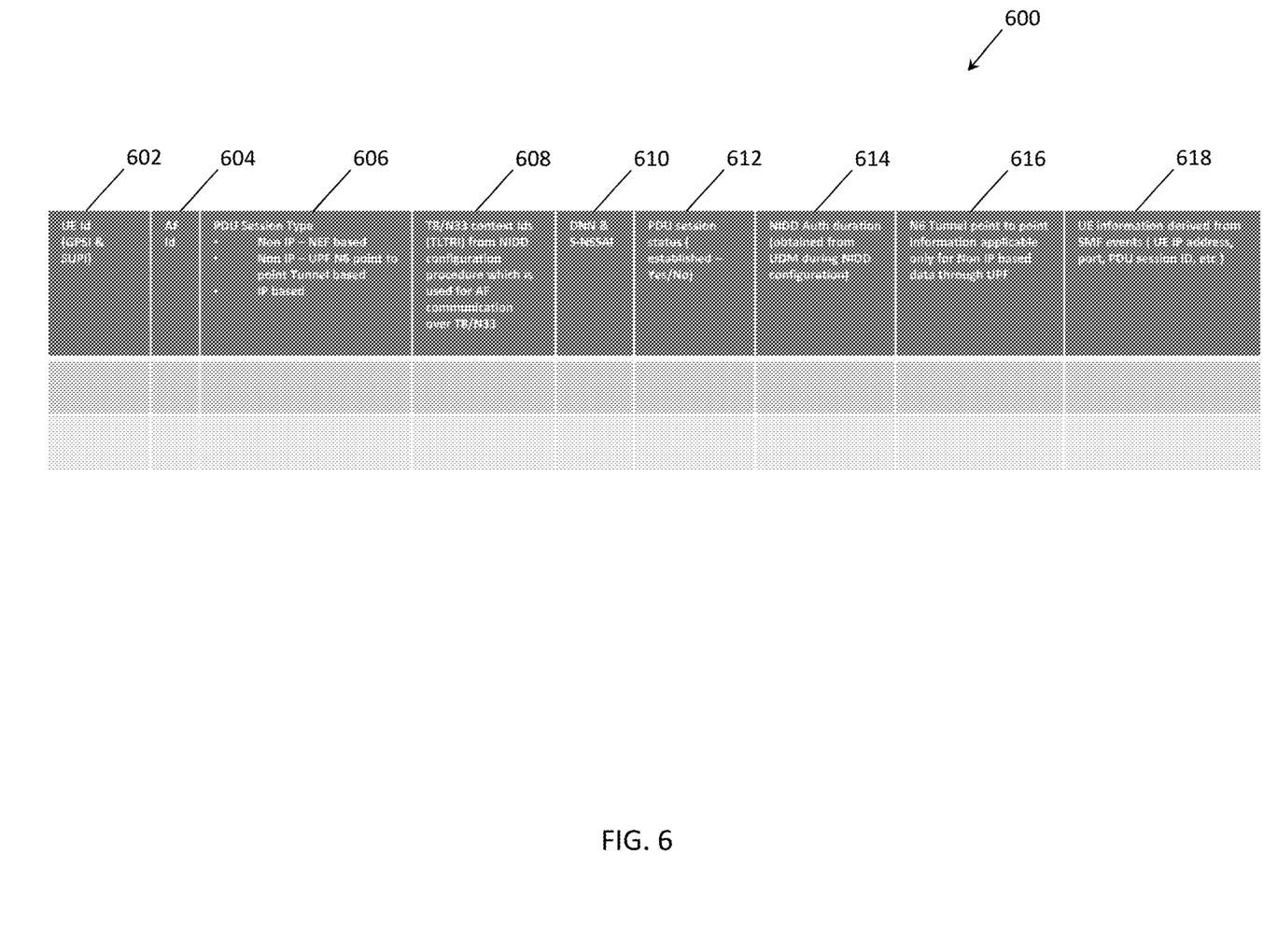
FIG. 6 is an exemplary database table maintained at the NEF for storing context information for communication sessions between UEs and AFs.

Afterwards, NEF 410 updates the user equipment context information with a PDU session identifier and a SMF identifier for UE 402. In some embodiments, NEF 410 may update a UE context data structure table as shown in FIG. 6. Notably, FIG. 6 illustrates an example UE context data table 600 that may include a number of entries, each of which corresponds to a user equipment identifier (see column 602). UE context data table 600 further includes an application function identifier column 604, a PDU session type column 606, context identifier column 608, DNN and S-NSSAI column 610, PDU session status column 612, NIDD authorization duration column 614, N6 tunnel point to point information column 616, and UE information derived from SMF events column 618. Although FIG. 6 depicts nine columns in UE context data table 600, additional columns (or fewer columns) can be utilized without departing from the scope of the disclosed subject matter.

In some embodiments, NEF 410 marks (e.g., in column 606 of UE context data table 600) the data delivery path as NIDD via NEF for handling the communication of MO and MT messages between user equipment 402 and application function 406. As such, NEF 410 processes the MO and MT messages as defined by 3GPP NIDD services (e.g., as specified in TS 23.502 section 4.25). More specifically, NEF 410 communicates data with application function 406 over an N33/T8 interface that is facilitated by unified interface 408.

In some embodiments, NEF 410 receives a PDU session event change notification (e.g., a PDU session establishment event/UP path change notification) from an SMF (e.g., SMF 428 in communication plane 412) indicating a PDU session establishment for NIDD via UPF (e.g., UPF 420). In this scenario, NEF 410 enables a N6 tunnel listener server (not shown) to accept MO messages from UPF 420. In addition, the N6 tunnel listener server at NEF 410 is enabled to send the MT messages received from AF 406 via unified interface 408 and UPF 420 to user equipment 402. Afterwards, NEF 410 updates the user equipment context information with a local context information database (e.g., update entry for UE 402 in UE context data table 600). For example, NEF 410 can store PDU session information and user equipment information corresponding to UE 402 (e.g., IPv6 prefix of user equipment to be used later for MT messages from application function 406) in UE context data table 600.

At this point, NEF 410 may be configured to process the MO and MT messages received via the data delivery path from UE 402 and AF 406, respectively. Specifically, NEF 410 may receive the UE generated MO messages from UPF 420 via N6 point-to-point tunnel interface 422 (which is established by UPF 420). Afterwards, NEF 410 can be configured to extract the application payload information (e.g., transmission control protocol (TCP)/IP payload data) from the encapsulated UDP MO payload messages that are received from UPF 420 via tunnel interface 422. Specifically, NEF 410 can extract and/or retrieve the user equipment context information, including source IP address and port identifier, from the encapsulated TCP packet. Afterwards, NEF 410 may extract the encapsulated TCP/IP payload which can be sent as NIDD MO submit messages to the application function 406 over unified interface 408, e.g., a T8/N33 interface, (e.g., using a context identifier retrieved from context data information for user equipment 402) created during the NIDD configuration procedure.

In some embodiments, NEF 410 is configured to receive the NIDD MT messages from application function 406 over unified interface 408. NEF 410 then constructs a N6 compliant message (e.g., a UDP packet) that contains the TCP/IP payload of the MT message received from application function 406. Notably, the new message is directed by NEF 410 towards user equipment 402 using the user equipment IP address previously retrieved and subsequently encapsulated into UDP packets. In particular, NEF 410 sends the UDP packets over to UPF 420 via the N6 point-to-point tunnel interface 422. Upon receipt of the UDP packets, UPF 420 eventually sends the encapsulated MT messages towards user equipment 402 using a PDU session established over the control plane (e.g., communication plane 412) to user equipment 402.

Once the communication session is completed, NEF 410 receives a PDU session release event from SMF 428 and ceases to process the MT messages received from application function 406 via the unified interface 408. In some embodiments, NEF 410 may be configured to buffer MT messages until the PDU session is re-established.

As indicated above, a third communication plane 413 can be utilized to establish a data delivery path over the user plane. For example, NEF 410 can be configured to receive a PDU session event message (e.g., a PDU session establishment message) when user equipment 402 establishes an IP type PDU session. In response, NEF 410 stores the user equipment's IP address in the user equipment context information (e.g., UE context data table 600) and processes the MO and MT messages communicated between UE 402 and application function 406. In particular, NEF 410 receives the MO IP data messages from UPF 430 over an N6 interface. NEF 410 subsequently retrieves and/or extracts the application payload from the received TCP/IP packets and encapsulates the MO message in a T8/N33 message that is sent to application function 406 using TLTRI (e.g., NIDD configuration context identifier). Further, NEF 410 can receive a MT message from application function 406 over unified interface 408 (e.g., T8/N33 interface) and can be configured to subsequently extract (e.g., decrypt) and/or retrieve the data payload from the encapsulated message. Notably, NEF 410 constructs the TCP/IP payload message using an application payload and subsequently sends the message to UE 402 via UPF 430 using the user equipment IP address. Specifically, UPF 430 routes the message towards a user equipment 402 over a user plane (e.g., communication plane 413) via a RAN based user equipment IP address. Further, NEF 410 can be configured to remove the user equipment context information from the context information database (e.g., UE context data table 600) upon receiving a PDU session release event message from SMF 438 and subsequently stop processing the communicated MO and MT messages.

Figure 7:
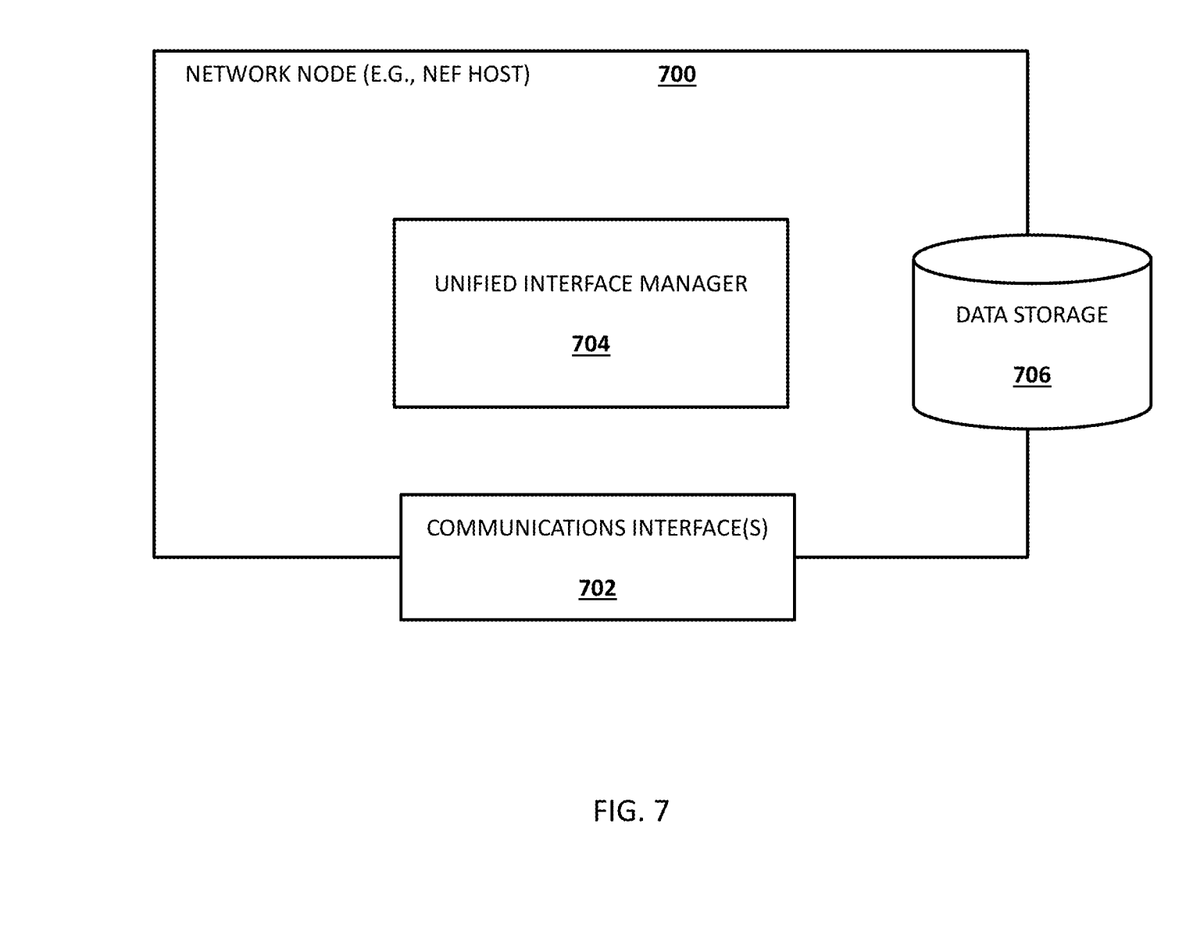
FIG. 7 is a block diagram illustrating an example network node configured for hosting a NEF and unified interface manager.

FIG. 7 is a block diagram illustrating an example network node 700 configured for providing a unified interface that is configured to support a data delivery communication path between a user equipment and application function via a NEF. Network node 700 may represent any suitable entity or entities for performing aspects of supporting the unified interface. In some embodiments, node 700 may represent or include one or more 5GC network functions, e.g., a network exposure service, network exposure function, or the like. In some embodiments, network node 700 may represent or include a network gateway, a network proxy, an edge security device, or any related computing device that is configured to host a NEF or similar functionality.

In some embodiments, network node 700 or a related module may be configured (e.g., via programming logic) to support a unified interface, which may be embodied as a T8 and/or N33 interface supported by the hosted NEF. In particular, the unified interface that is implemented at a network node 700 can communicate and support small and infrequent data communications directed to an application function from a UE and/or IoT device. Notably, in this scenario, the terminating application function is agnostic and unaware of the underlying data communication path in the 5G network that is being utilized by the user equipment and the network node 700. The disclosed solution further enables both non-IP and IP based communication (e.g., NIDD and non-IP data delivery). Consequently, the disclosed subject matter thereby allows seamless data service for a user equipment or IoT device moving among different data communication paths without any service impact. It is further noted that there are no customized interfaces being implemented at other network functions, i.e., the disclosed subject matter is based on existing 3GPP defined interfaces.

Referring to FIG. 7, network node 700 may include one or more communications interface(s) 702 for communicating messages via a communications environment, e.g., a home 5GC network. In some embodiments, communications interface(s) 702 may include a unified interface (e.g., a T8/N33 interface) for communicating with one or more application functions in the manner described above. Further, communication interfaces 702 can further include the necessary interfaces utilized by listener servers established by the NEF to establish a data delivery path with a UPF (e.g., an N6 interface, a N6 point to point tunnel interface, etc.)

Network node 700 may include a unified interface manager 704. Unified interface manager 704 may be any suitable entity (e.g., software executing on at least one processor of the network node) for performing one or more aspects of disclosed data delivery techniques via the unified interface. In some embodiments, unified interface manager 704 may include functionality for preconfiguring a configuration database (e.g., configuration table 500 in FIG. 5) stored in local data storage 706, maintaining and updating a UE context database (e.g., UE context data table 600 in FIG. 6), and performing the necessary algorithms for executing and supporting the disclosed modes of small and infrequent data communication between a low powered UE and AF in a 5G network. For example, in some embodiments, unified interface manager 704 can be configured to i) receive, from a session management function, a protocol data unit session event change notification message associated with a UE, ii) establish a data delivery path between the UE and an application function via one of a plurality of data delivery planes that traverse the NEF in response to the PDU session event change notification message, and iii) process messages communicated between the UE and the AF over any of the plurality of data delivery planes using a single unified interface supported by the NEF. In particular, the three delivery planes that unified interface manager 704 can establish include a non-IP data delivery (NIDD) based data communication path established in a control plane between the UE and the AF via the NEF, a NIDD based data communication path established between the UE and the AF via the NEF and a UPF that are communicatively connected using a N6 point to point tunnel, and an Internet protocol (IP) data delivery based data communication path between the UE and AF that are communicatively connected via the NEF and the UPF using a N6 interface.

In some embodiments, network node 700 may access (e.g., read from and/or write information to) data storage 706. Data storage 706 may be any suitable entity (e.g., a computer readable medium or memory) for storing various data. As indicated above, data storage 706 can be configured to store a plurality of different databases, such as a configuration database (represented by configuration table 500 shown in FIG. 5) or the UE context data structure that enables data communication between the UE and AF (represented by UE context data table 600 shown in FIG. 6).

Figure 8:
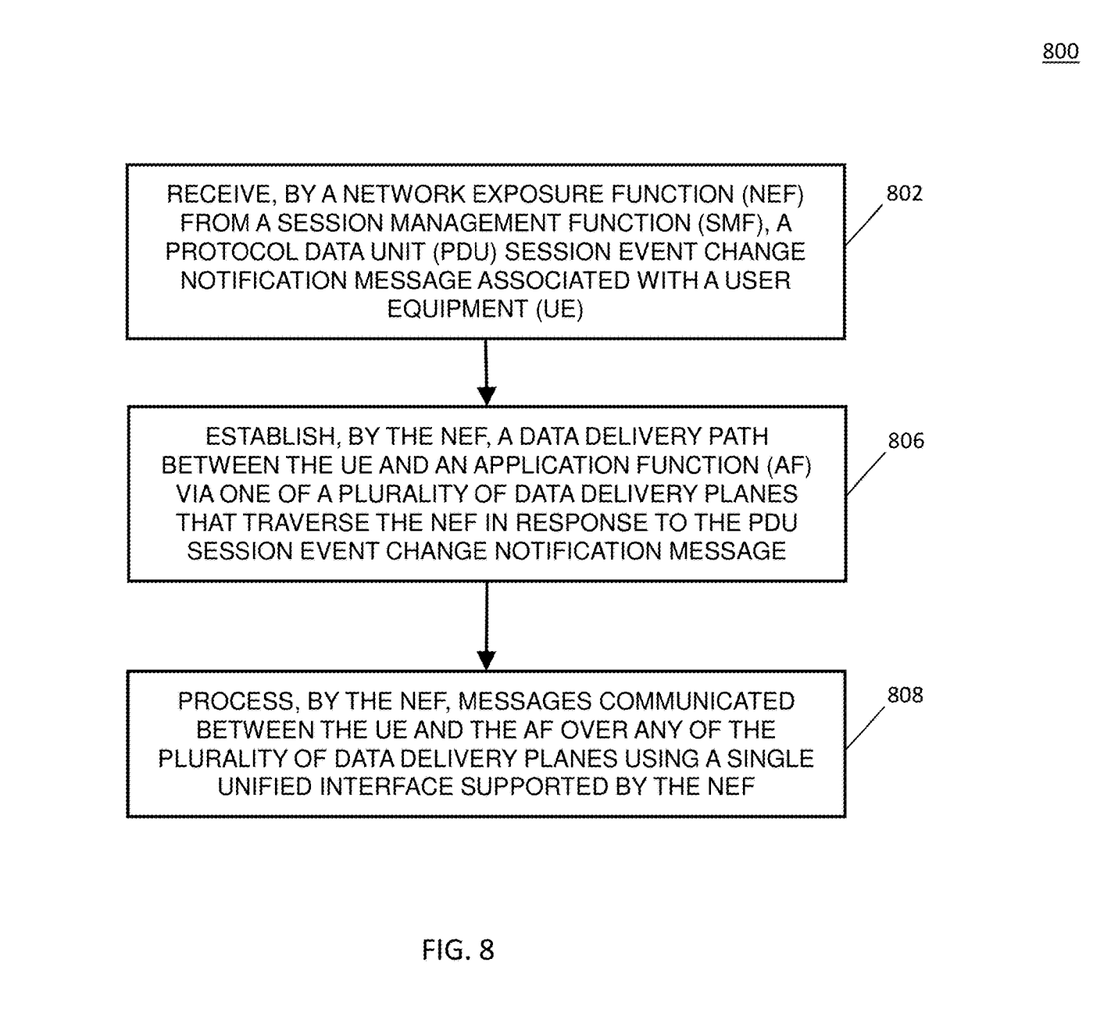
FIG. 8 is a flow chart illustrating an example process for providing a unified interface configured to support infrequent communications via a network exposure function or service.

FIG. 8 is a diagram illustrating an example process 800 for providing a unified interface that is configured to support small and infrequent data communication between a user equipment and application function via a network exposure function. In some embodiments, example process 800 described herein, or portions thereof, may be performed at or performed by network node 700, unified interface manager 704, and/or another module or node.

In step 802, a PDU session event change notification message associated with a UE is received by a NEF from a session management function (SMF). Notably, the NEF has previously subscribed to the SMF for PDU session events for a given UE (e.g., using a Nsmf_EventExposure_Subscribe service operation). In the event the UE triggers a PDU session event (e.g., UP path change, a PDU session release, a PLMN change, a UE IP address change, a communication failure, and a PDU session establishment, etc.), the SMF will notify the NEF of the session event.

In step 804, the NEF establishes a data delivery path between the UE and an AF via one of a plurality of data delivery planes that traverse the NEF in response to the PDU session event change notification message. In some embodiments, the NEF determines the data delivery plane in which to service the communication session between the UE and the AF. In some embodiments, the NEF is configured to establish the appropriate data delivery path based on a notification contained in the PDU session event change notification message. For example, if the NEF is notified that the UE is attempting a establish a session over a control plane via a UPF, the NEF will enable an N6 tunnel listener server to accept MO messages from the UPF over the control plane (e.g., NIDD data path over control plane via UPF). In the event the NEF is notified that the UE is attempting a establish a session over a user plane via a UPF, the NEF will enable an N6 listener server to receive MO messages from the UPF over the user plane (e.g., non-IP data delivery data path over user plane via UPF). In addition, the NEF may also be configured to directly receive MO messages itself from the UE over the control plane (e.g., NIDD data path over control plane via NEF).

In block 806, messages communicated between the UE and the AF over any of the plurality of data delivery planes are processed by the NEF using a single unified interface supported by the NEF. In some embodiments, the NEF is configured to process the MO and MT messages communicated between the UE and AF. Notably, regardless of the data delivery path utilized (e.g., NIDD data path over control plane via NEF, NIDD data path over control plane via UPF, or IP data delivery data path over user plane via UPF), the NEF is configured to utilize a single unified interface to provide MO messages to the AF and receive MT messages from the AF. In some embodiments, the unified interface may be a T8/N33 interface.

It will be appreciated that process 800 is for illustrative purposes and that different and/or additional actions may be used. It will also be appreciated that various actions described herein may occur in a different order or sequence.

It should be noted that network node 700, unified interface manager 704, and/or functionality described herein (e.g., as shown in FIG. 7) may constitute a special purpose computing device. Further, node 700, unified interface manager 704, and/or functionality described herein can improve the technological field of data communications in a 5G network. Notably, the disclosed subject matter can provide a unified interface that can be utilized by a NEF to establish any number of data delivery paths that can be used by a UE and an AF. Notably, the AF is agnostic of the underlying data communication path used by the NEF and its unified interface in the 5G network. Further, the unified interface allows for seamless data service that permits the movement of the UE between data delivery paths without any service impact.

The disclosure of each of the following references is incorporated herein by reference in its entirety to the extent not inconsistent herewith and to the extent that it supplements, explains, provides a background for, or teaches methods, techniques, and/or systems employed herein.

It will be understood that various details of the presently disclosed subject matter may be changed without departing from the scope of the presently disclosed subject matter. Furthermore, the foregoing description is for the purpose of illustration only, and not for the purpose of limitation.

REFERENCES 1. 3GPP TS 23.501—System architecture for the 5G System (5GS)
2. 3GPP TS 23.502—Procedures for the 5G System (5GS)
3. 3GPP TS 29.122—T8 reference point for Northbound APIs
4. 3GPP TS 29.522—N33 reference point for Northbound APIs 5. 3GPP TS 23.682—Architecture enhancements to facilitate communications with packet data networks and applications

What is claimed is:

1. A method for providing a unified interface that is configured to support communication between a user equipment (UE) and application function (AF) via a network exposure function (NEF), the method comprising:
   receiving, by a NEF from a session management function (SMF), a protocol data unit (PDU) session event change notification message associated with a UE;
   establishing, by the NEF, a data delivery path between the UE and an application function (AF) via one of a plurality of data delivery planes that traverse the NEF in response to the PDU session event change notification message, wherein the plurality of data delivery planes includes a non-IP data delivery (NIDD) based data communication path established in a control plane between the UE and the AF via the NEF, an NIDD based data communication path established between the UE and the AF via the NEF and a UPF that are communicatively connected using an N6 point to point tunnel, and an Internet protocol (IP) data delivery based data communication path between the UE and AF that are communicatively connected via the NEF and the UPF using an N6 interface, wherein the NEF is configured to initiate listening servers to monitor for packet traffic from a UPF in response to receiving the PDU session event change notification message and based on a UPF in a data delivery path of the PDU session event change notification message; and
   processing, by the NEF, messages communicated between the UE and the AF via the NEF over any of the plurality of data delivery planes using a single unified N33 interface supported by the NEF.

2. The method of claim 1 wherein the UE includes a low-powered Internet of things (IoT) device.

3. The method of claim 1 wherein the NEF is configured to switch between the plurality of data delivery planes while maintaining attachment of the UE.

4. The method of claim 1 wherein the NEF functions as a PDU session anchor during the use of each of the plurality of data delivery planes.

5. A system for providing a unified interface that is configured to support communication between a user equipment (UE) and application function (AF) via a network exposure function (NEF), the system comprising:
   a network node comprising:
      at least one processor;
      a memory, wherein the memory and the at least one processor belong to unified interface device configured to host a NEF; and
      a unified interface manager that is stored in the memory of the NEF and when executed by the at least one processor is configured for receiving from a session management function (SMF) a protocol data unit (PDU) session event change notification message associated with a UE, establishing a data delivery path between the UE and an application function (AF) via one of a plurality of data delivery planes that traverse the NEF in response to the PDU session event change notification message, wherein the plurality of data delivery planes includes a non-IP data delivery (NIDD) based data communication path established in a control plane between the UE and the AF via the NEF, an NIDD based data communication path established between the UE and the AF via the NEF and a UPF that are communicatively connected using an N6 point to point tunnel, and an Internet protocol (IP) data delivery based data communication path between the UE and AF that are communicatively connected via the NEF and the UPF using an N6 interface, wherein the NEF is configured to initiate listening servers to monitor for packet traffic from a UPF in response to receiving the PDU session event change notification message and based on a UPF in a data delivery path of the PDU session event change notification message, and processing messages communicated between the UE and the AF via the NEF over any of the plurality of data delivery planes using a single unified N33 interface supported by the NEF.

6. The system of claim 5 wherein the UE includes a low-powered Internet of things (IoT) device.

7. The system of claim 5 wherein the NEF is configured to switch between the plurality of data delivery planes while maintaining attachment of the UE.

8. The system of claim 5 wherein the NEF functions as a PDU session anchor during the use of each of the plurality of data delivery planes.

9. A non-transitory computer readable medium having stored thereon executable instructions that when executed by a processor of a computer control the computer to perform steps comprising:
   receiving, by a NEF from a session management function (SMF), a protocol data unit (PDU) session event change notification message associated with a UE;
   establishing, by the NEF, a data delivery path between the UE and an application function (AF) via one of a plurality of data delivery planes that traverse the NEF in response to the PDU session event change notification message, wherein the plurality of data delivery planes includes a non-IP data delivery (NIDD) based data communication path established in a control plane between the UE and the AF via the NEF, an NIDD based data communication path established between the UE and the AF via the NEF and a UPF that are communicatively connected using an N6 point to point tunnel, and an Internet protocol (IP) data delivery based data communication path between the UE and AF that are communicatively connected via the NEF and the UPF using an N6 interface, wherein the NEF is configured to initiate listening servers to monitor for packet traffic from a UPF in response to receiving the PDU session event change notification message and based on a UPF in a data delivery path of the PDU session event change notification message; and
   processing, by the NEF, messages communicated between the UE and the AF via the NEF over any of the plurality of data delivery planes using a single unified N33 interface supported by the NEF.

10. The non-transitory computer readable medium of claim 9 wherein the UE includes a low-powered Internet of things (IoT) device.

11. The non-transitory computer readable medium of claim 9 wherein the NEF is configured to switch among the plurality of data delivery planes while maintaining attachment of the UE.

12. The non-transitory computer readable medium of claim 9 wherein the NEF functions as a PDU session anchor during the use of each of the plurality of data delivery planes.

* * * * *

UNITED STATES PATENT AND TRADEMARK OFFICE
CERTIFICATE OF CORRECTION

PATENT NO. : 11,895,716 B2
APPLICATION NO. : 17/110255
DATED : February 6, 2024
INVENTOR(S) : Aravind et al.

It is certified that error appears in the above-identified patent and that said Letters Patent is hereby corrected as shown below:

In the Specification

In Column 2, Lines 40-56, delete "(UE) and application function (AF) via a network exposure function (NEF) includes a network node comprising at least one processor and memory, wherein the memory and the at least one processor belong to unified interface device configured to host a NEF. The network node further includes a unified interface manager that is stored in the memory of the NEF and when executed by the at least one processor is configured for receiving from a session management function (SMF) a protocol data unit (PDU) session event change notification message associated with a UE, establishing a data delivery path between the UE and an application function (AF) via one of a plurality of data delivery planes that traverse the NEF in response to the PDU session event change notification message, and processing messages communicated between the UE and the AF over any of the plurality of data delivery planes using a single unified interface supported by the NEF." and insert the same on Column 2, Line 39, as a continuation of the same paragraph.

Signed and Sealed this
Fourteenth Day of May, 2024

Katherine Kelly Vidal
*Director of the United States Patent and Trademark Office*